US010045216B1

United States Patent
Indurkar et al.

(10) Patent No.: US 10,045,216 B1
(45) Date of Patent: Aug. 7, 2018

(54) WIFI ACCESS POINT CONNECTION PROTOCOL ADAPTATION

(71) Applicant: Sprint Communications Company L.P., Overland Park, KS (US)

(72) Inventors: Dhananjay Indurkar, Overland Park, KS (US); Mark D. Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/583,998

(22) Filed: May 1, 2017

(51) Int. Cl.
| | |
|---|---|
| H04W 4/12 | (2009.01) |
| H04W 12/06 | (2009.01) |
| H04W 76/02 | (2009.01) |
| H04W 8/22 | (2009.01) |
| H04W 8/18 | (2009.01) |
| H04W 76/11 | (2018.01) |
| H04W 88/08 | (2009.01) |
| H04W 84/12 | (2009.01) |

(52) U.S. Cl.
CPC .............. *H04W 12/06* (2013.01); *H04W 4/12* (2013.01); *H04W 8/18* (2013.01); *H04W 8/22* (2013.01); *H04W 76/021* (2013.01); *H04W 76/11* (2018.02); *H04W 84/12* (2013.01); *H04W 88/08* (2013.01)

(58) Field of Classification Search
CPC ......... H04W 12/06; H04W 4/12; H04W 8/18; H04W 8/22; H04W 76/021
See application file for complete search history.

(56) References Cited

U.S. PATENT DOCUMENTS

| | | | |
|---|---|---|---|
| 8,572,698 B1 * | 10/2013 | Kandasamy .......... | H04W 12/06 370/328 |
| 9,173,097 B2 | 10/2015 | Zhu et al. | |
| 2012/0240197 A1 * | 9/2012 | Tran .................... | H04L 63/1416 726/4 |
| 2013/0007858 A1 * | 1/2013 | Shah .................... | H04L 63/0815 726/6 |
| 2013/0023236 A1 * | 1/2013 | Murray .................... | H04W 4/50 455/411 |
| 2013/0139221 A1 * | 5/2013 | Gundavelli ........... | H04W 12/06 726/4 |
| 2013/0198817 A1 * | 8/2013 | Haddad .................. | H04L 63/18 726/5 |

(Continued)

*Primary Examiner* — Qun Shen

(57) ABSTRACT

A WiFi access point. The WiFi access point comprises a WiFi radio transceiver, a wired transceiver, a processor, a memory, and an application stored in the memory. When executed by the processor, the application transmits a first service set identifier via the radio, receives a request for connection from a wireless communication device via the radio directed to the first service set identifier, determines that the device is not HotSpot protocol compliant, transmits a second service set identifier via the radio as a private message that comprises a captive portal to the device, and receives a credential message from the device via the radio directed to the second service set identifier, wherein the credential message identifies a mobile equipment identity (MEID) and a phone number of the device. The application further authenticates the device with a server based on the credential message and provides a communication connection to the device.

20 Claims, 7 Drawing Sheets

(56) References Cited

U.S. PATENT DOCUMENTS

| | | | | |
|---|---|---|---|---|
| 2014/0189808 A1* | 7/2014 | Mahaffey | ............... | H04L 63/083 |
| | | | | 726/4 |
| 2014/0325028 A1* | 10/2014 | Jiang | ....................... | H04L 67/02 |
| | | | | 709/219 |
| 2014/0355523 A1* | 12/2014 | Congdon | ............... | H04W 76/02 |
| | | | | 370/328 |
| 2016/0095153 A1* | 3/2016 | Chechani | ............... | H04W 12/08 |
| | | | | 370/338 |

* cited by examiner

WIFI ACCESS POINT CONNECTION PROTOCOL ADAPTATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A WiFi access point (AP) is an electronic communication device that may provide a wireless link to WiFi compliant devices and communicatively couple such devices to a wired network such as the Internet. The WiFi AP may couple to the Internet via an external router device. Alternatively, the WiFi AP may be incorporated as an integral component of a router (i.e., a wireless router). WiFi APs may be inexpensive consumer electronic devices. Private citizens may install WiFi APs in their homes. Hotels may install one or more WiFi APs in their hotels to provide Internet access to hotel guests. Businesses such as coffee shops or book stores may install one or more WiFi APs to provide Internet access to customers. Some businesses are providing public WiFi APs to promote off-loading data communications from the cellular networks as a profit making enterprise. Many mobile communication devices have applications that automatically select a WiFi wireless link for coupling to a communication network, for example to avoid tolling data usage to a communication service subscription account that features a monthly data limit.

SUMMARY

In an embodiment, a WiFi access point is disclosed. The WiFi access point comprises a WiFi radio transceiver, a wired transceiver, a processor, a non-transitory memory, and an application stored in the non-transitory memory. When executed by the processor, the application transmits a first service set identifier via the WiFi radio transceiver, receives a request for connection from a wireless communication device via the WiFi radio transceiver directed to the first service set identifier, determines that the wireless communication device is not HotSpot protocol compliant, transmits a second service set identifier via the WiFi radio transceiver as a private message to the wireless communication device, where the private message comprises a captive portal, and receives a credential message from the wireless communication device via the WiFi radio transceiver directed to the second service set identifier, wherein the credential message identifies a mobile equipment identity (MEID) and a phone number of the mobile communication device. The application further transmits an authentication request message via the wired transceiver to an authentication server, where the authentication request message comprises the MEID and phone number of the mobile communication device, receives an authentication confirmation message via the wired transceiver from the authentication server, and provides a communication connection to the mobile communication device, where the WiFi radio transceiver provides a wireless link to the mobile communication device based on the second service set identity and wireline transceiver communicatively couples the mobile communication device to the Internet.

In another embodiment, a method of providing a communication connection by a WiFi access point to a wireless communication device is disclosed. The method comprises transmitting a first service set identifier by a WiFi access point via a WiFi radio transceiver of the WiFi access point, receiving a request for connection from a wireless communication device directed to the first service set identifier by the WiFi access point via the WiFi radio transceiver, determining by the WiFi access point based on the request for connection that the wireless communication device is not HotSpot protocol compliant, transmitting a captive portal by the WiFi access point via the WiFi radio transceiver to the wireless communication device, and receiving a credential message comprising credentials from the wireless communication device by the WiFi access point via the WiFi radio transceiver. The method further comprises transmitting an authentication request message by the WiFi access point via a wired transceiver of the WiFi access point to an authentication server, where the authentication request message comprises the credentials, receiving an authentication confirmation message by the WiFi access point via the wired transceiver from the authentication server, and providing a communication connection to the mobile communication device by the WiFi access point, where the WiFi radio transceiver provides a wireless link to the mobile communication device and the wireline transceiver communicatively couples the mobile communication device to the Internet.

In yet another embodiment, a WiFi access point is disclosed. The WiFi access point comprises a WiFi radio transceiver, a wired transceiver, a processor, a non-transitory memory, and an application stored in the non-transitory memory. When executed by the processor, the application, receives a request for connection from a wireless communication device via the WiFi radio transceiver, determines that the wireless communication device is not configured to support an automatic WiFi access protocol, transmits a captive portal via the WiFi radio transceiver to the wireless communication device, and receives a credential message from the wireless communication device via the WiFi radio transceiver, wherein the credential message comprises an identity of the mobile communication device. The application further transmits an authentication request message via the wired transceiver to an authentication server, where the authentication request message comprises the identity of the mobile communication device and a designation of a premium communication service, receives an authentication confirmation message via the wired transceiver from the authentication server indicating that the mobile communication device is authorized for communication service in a common carrier communication network and that the mobile communication device is authorized to access the premium communication service, and provides a communication connection to the mobile communication device, where the WiFi radio transceiver provides a wireless link to the mobile communication device and the WiFi wireline transceiver communicatively couples the mobile communication device to the Internet, where both the quality of service of the wireless link provided by the wireless transceiver to the mobile communication device and the wired link provided by the wired transceiver to couple the mobile communication device to the Internet is based on the premium communication service.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
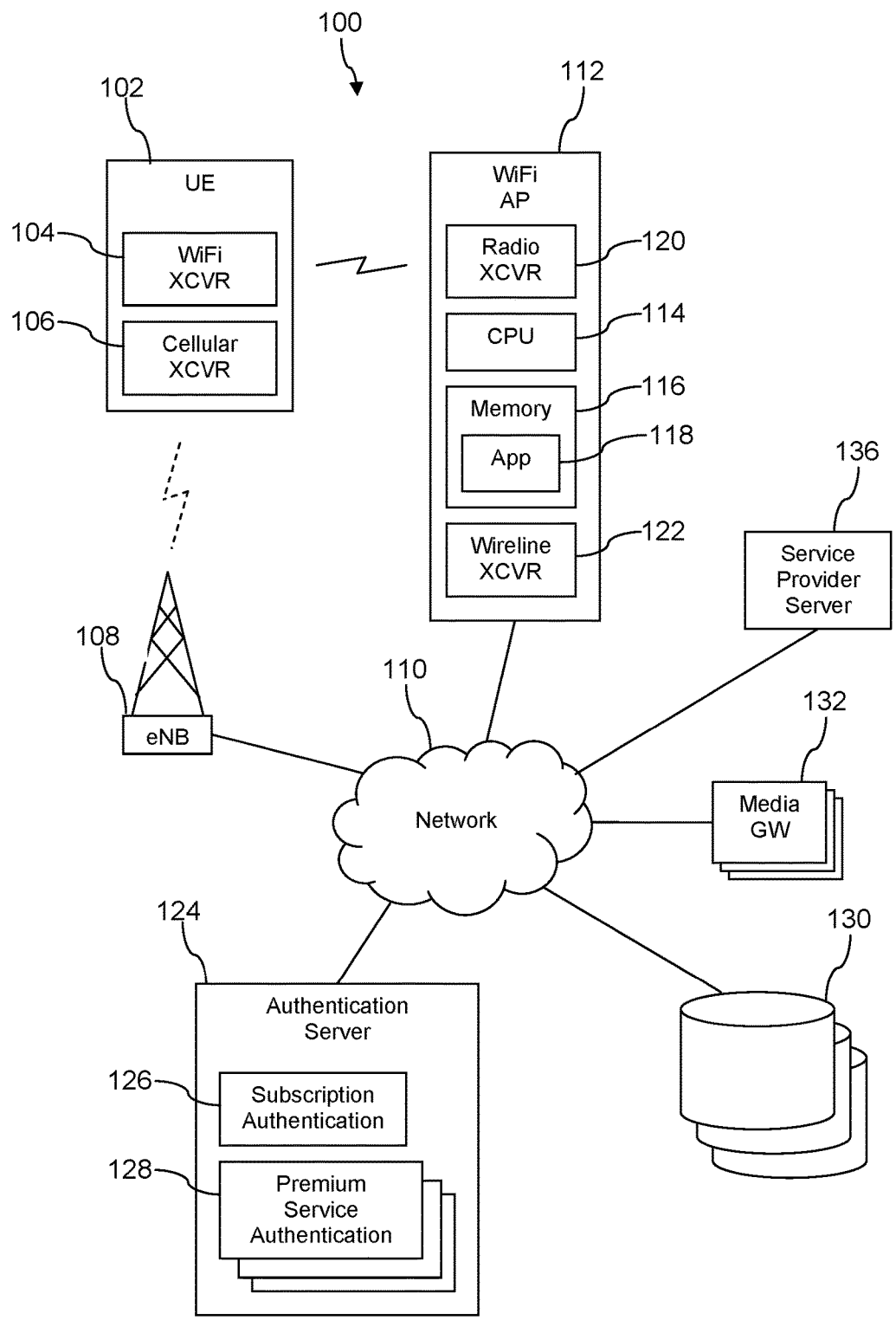
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A self-adapting WiFi access point (AP) is taught herein. The WiFi AP automatically handles connection requests from mobile communication devices, adapting the authentication procedure it employs based on determining the capabilities of each different mobile communication device. This self-adaptation may be referred to as "chameleon-like" behavior in some contexts herein. New mobile communication devices may be configured to request WiFi connections according to an automatic WiFi access protocol such as a HotSpot connection protocol (e.g., "HotSpot 2.0" or some other version of the HotSpot protocol). But many legacy mobile communication devices may be "down REV" and be incapable of interworking with the WiFi AP according to the automatic WiFi access protocol. The self-adapting WiFi AP taught herein is able to overcome this challenge and increase the number of mobile communication devices that can be offloaded from the cellular communication networks, thereby reducing the traffic loads on the cellular networks as well as saving consumers tolling of data usage on limited data subscription service plans. This particular information technology and/or electronic communication system solution can be analyzed as increasing the bandwidth and the efficiency of electronic resources, viewed as a totality, by redistributing the traffic from the cellular radio access network (RAN) to the WiFi APs—redistributing traffic from generally heavily loaded communication nodes (cell sites) to generally lightly loaded communication nodes (WiFi APs). This allows cellular RANs to service more users than otherwise would be possible without the WiFi AP traffic redistribution.

The WiFi AP may broadcast its availability for establishing wireless connections associated with a first service set identifier (SSID). When the WiFi AP receives a request for connection from a mobile communication device, it may determine that the requesting device is not configured to support an automatic WiFi access protocol (e.g., based on header information included in the connection request). In this case, the WiFi AP automatically changes its mode of operation with reference to that requesting device. The WiFi AP may send a private message to the requesting device including a universal access message (UAM) prompt, such as a captive portal, and a second SSID. The WiFi AP may receive credentials associated with the connection request from the mobile communication device addressed to the second SSID. These credentials may be an identity of the mobile communication device and/or a security token such as a password. The second SSID may be employed by the WiFi AP to separate and distinguish its handling of WiFi communication messages.

The WiFi AP may then authenticate the device with a communication service provider, for example a wireless communication service provider or some other service provider. The WiFi AP may identify which service provider the device receives communication service from based on the credentials (e.g., device identity) sent by the device. For example, the WiFi AP may look up the service provider based on a mobile equipment identity (MEID) or phone number (different service providers may be associated with different predefined ranges of MEIDs and/or phone numbers) or other identity provided by the mobile communication device when responding to the second SSID. If the service provider authenticates the device, the WiFi AP may provide a wireless connection to the device, communicatively coupling the wireless communication device to the Internet or to another communication network.

The WiFi AP may further perform a premium service authorization process on behalf of the mobile communication device. For example, a device may be subscribed to receive premium communication services or be granted a temporary promotional digital right to stream video from a content provider. When the device provides its request for connection, an identity of a premium communication service may be included in the request. In this case the WiFi AP may need to authorize access of the device to the premium service in addition to authenticating the device for basic communication service. In an embodiment, the authentication and authorization are integrated into a single request-response exchange with a server. In another embodiment, however, for example in the case where the content provider is different from the basic communication service provider, the authentication and authorization processes may be conducted via different communication paths and with different servers.

The WiFi AP may be configured with data or information that promote it determining on its own what authentication and authorization processes to follow based on a service provider who delivers basic communication service to the device and based on a premium content or premium communication service requested by the device. The details of authentication and authorization may be abstracted and hidden from the WiFi AP when supporting the automatic access protocol (e.g., a HotSpot protocol), but when the WiFi AP self-adapts to provide connections to legacy devices as described herein, the WiFi AP desirably does further processing and adapting per the details of the given communication request. It is noted that the WiFi AP is handling these processes via different SSIDs (e.g., a first SSID for processing HotSpot compliant connections and a second SSID for processing connection requests for legacy devices unable to comply with the HotSpot protocol), at least through the completion of authentication and authorization with legacy devices. Once the legacy device is authenticated and optionally authorized to access a premium communication service, its connection may be transferred to the first SSID.

Turning now to FIG. 1, a communication system 100 is described. In an embodiment, system 100 comprises a mobile communication device 102 comprising a WiFi radio transceiver 104 and a cellular radio transceiver 106. The mobile communication device 102 may establish a wireless communication link via the cellular radio transceiver 106 to a cell site 108, and the cell site 108 may communicatively couple the device 102 to a network 110, for example to complete a data call or a voice call. The system 100 may further comprise a WiFi access point (AP) 112 that may provide a wireless communication link via the WiFi radio transceiver 104 to the device 102 and thereby communicatively couple the device 102 to the network 110. In some circumstances it may be desirable for the device 102 to complete data calls and/or voice calls via the WiFi AP 112 rather than via the cell site 108, for example to reduce tolling of a data usage of a limited data communication service subscription plan and to reduce loading on a cellular infrastructure.

The mobile communication device may be one of a mobile phone, a smart phone, a personal digital assistant (PDA), a media player, a wearable computer, a headset computer, a laptop computer, a tablet computer, or a notebook computer. The network 110 may comprise one or more private networks, one or more public networks, or a combination thereof. The cell site 108 may provide a wireless link to the cellular radio transceiver 106 according to a long term evolution (LTE), code division multiple access (CDMA), a global system for mobile communications (GSM), or a worldwide interoperability for microwave access (WiMAX) wireless communication protocol. It is understood that the system 100 may comprise any number of mobile communication devices 102, cell sites 108, and WiFi APs 112.

The system 100 may further comprise an authentication server 124 that executes a subscription authentication application 126 and one or more premium service authentication application 128. The system 100 may further comprise one or more content data stores 130 and one or more media gateways 132. The content in the data stores 130 may comprise browser content (web pages), static image content, video content, or other. The content accessed via the data stores 130 may further include streaming content, for example live feeds from events such as premium communication content live streamed from sports events. The content data stores 130 may provide a variety of premium communication content. The media gateway 132 may provide the content from the content data store 130 to the UE 102.

When the UE 102 attempts to connect to the WiFi AP 112, a WiFi adaptation application 118 stored in a memory 116 of the WiFi AP 112 and executed by a processor 114 of the WiFi AP 112 may determine that the UE 102 is not able to comply with the HotSpot communication protocol. The UE 102 may request connection for a voice communication connection or for a data communication connection. In an embodiment, the UE 102 may further request for a premium communication service connection. The WiFi adaptation application 118 may determine this based on header information in the connection request message sent by the UE 102. In this case, the adaptation application 118 may transmit a private message to the UE 102 inviting it to communicate with it on a second SSID. When the UE 102 responds via the second SSID, the WiFi adaptation application 118 may provide a universal access message (UAM) prompt, such as a captive portal web page, to the UE 102 for display on the UE 102. The UAM prompt (e.g., a captive portal web page) may prompt a user of the UE 102 to enter identification information whereby to authenticate the wireless service subscription of the UE 102. A captive portal is a landing web page that provides an interface for gaining access to a communication infrastructure, for example to gain access to the WiFi AP 112. The captive portal may prompt the UE 102 to provide security tokens such as a password.

The UE 102 may send a response in the form of a credential message to the WiFi adaptation application 118. The credential message may comprise a mobile equipment identity (MEID) associated with the hardware of the UE 102 and may comprise a phone number associated with the UE 102. The credential message may further comprise an identity of a subscriber to a premium communication service, for example a subscriber associated with the UE 102.

The adaptation application 118 parses the credential information received from the UE 102 on the second SSID. The adaptation application 118 then interworks with a service provider server 136 to authenticate the UE 102 (e.g., to verify that the UE 102 has a service plan with the subject wireless communication service provider). In some cases the WiFi AP 112 may be provided by a company with a business relationship with one or more wireless communication service providers to provide service to off-load the cellular network. Authentication of the wireless communication service subscription of the UE 102 may be performed in part to obtain payment under the business relationship. If the UE 102 is authenticated by the service provider server 136, the WiFi AP 112 may connect the UE 102 to the network 110. If the UE 102 is not authenticated, the WiFi AP 112 may return a connection refused message to the UE 102.

In some cases UEs 102 which may be HotSpot compliant may not be able to connect via HotSpot for one reason or another. In this case, the adaptation application 118 may send a private message to the subject UE 102 requesting it communicate with it on the second SSID and complete the WiFi connection in the manner used to connect UEs 102 that are not HotSpot compliant.

The WiFi adaptation application 118 may further interwork with a provider of premium communication content to authorize the UE 102 to receive premium communication content. The WiFi adaptation application 118 may send a subscriber identity or other credentials to the premium communication content provider for authorization. When the authorization to receive premium communication content is received, the WiFi adaptation application 118 may mediate with the media gateway 132 to establish and maintain a suitable quality of service (QoS) for the communication link via the network 110 to the content data store 130.

Figure 2A:
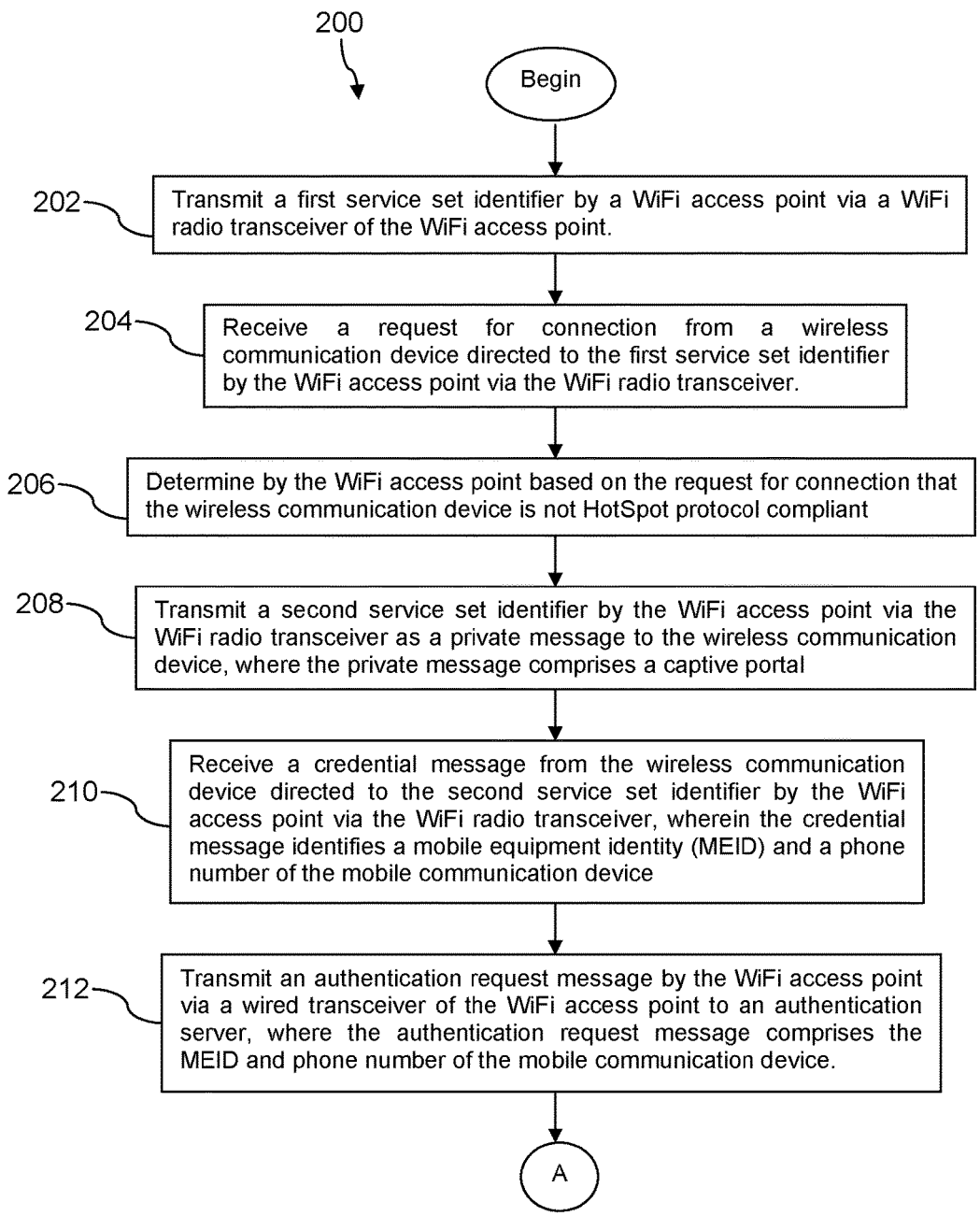
FIG. 2A and FIG. 2B is a flow chart of a method according to an embodiment of the disclosure.
Figure 2B:
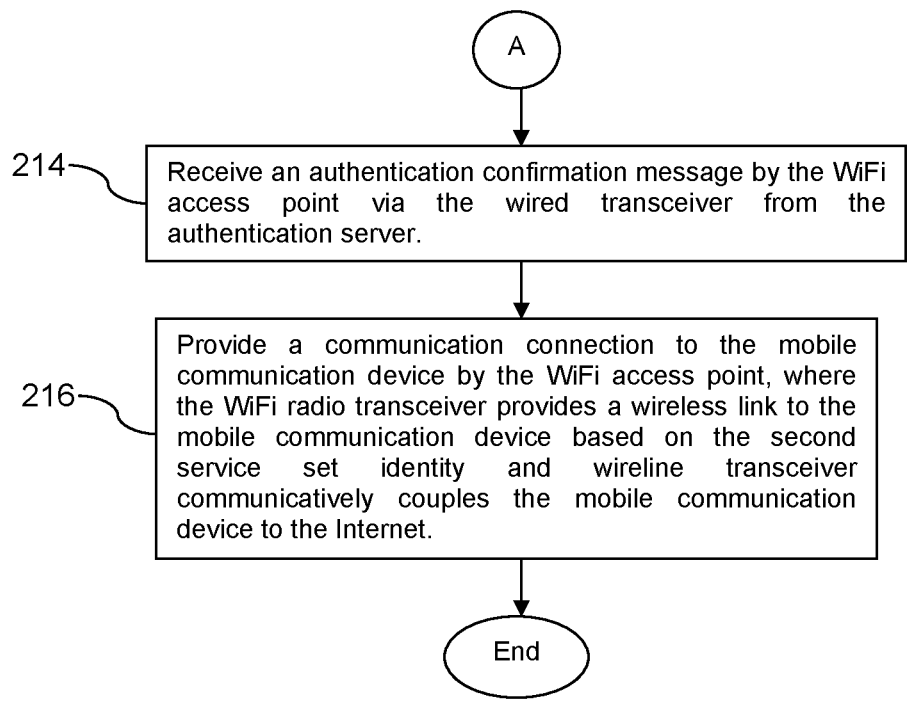

Turning now to FIG. 2A and FIG. 2B, a method 200 is described. Method 200 may be used by a WiFi AP to adaptively handle requests for communication connections from mobile communication devices and to provide a communication connection to the mobile communication device. At block 202, a WiFi radio transceiver of a WiFi access point transmits via a first service set identifier. At block 204, the WiFi access point receives a request for connection from a wireless communication device directed to the first service set identifier via the WiFi radio transceiver. At block 206, the WiFi access point determines based on the request for connection that the wireless communication device is not HotSpot protocol compliant.

At block 208, the WiFi access point transmits a second service set identifier via the WiFi radio transceiver as a private message to the wireless communication device, where the private message comprises a captive portal. At block 210, the WiFi access point receives a credential message from the wireless communication device directed to the second service set identifier via the WiFi radio transceiver, wherein the credential message identifies a mobile equipment identity (MEID) and a phone number of the mobile communication device. At block 212, the WiFi access point transmits an authentication request message via a wired transceiver of the WiFi access point to an authentication server, where the authentication request message comprises the MEID and phone number of the mobile communication device. At block 214, the WiFi access point receives an authentication confirmation message via the wired transceiver from the authentication server. At block 216, the WiFi access point provides a communication connection to the mobile communication device, where the WiFi radio transceiver provides a wireless link to the mobile communication device based on the second service set identifier and the wireline transceiver communicatively couples the mobile communication device to the Internet.

The method 200 may further comprise receiving a request for connection by the WiFi access point from a second wireless communication device via the WiFi radio transceiver directed to the first service set identifier; determining by the WiFi access point that the second wireless communication device is HotSpot protocol compliant; authenticating the second wireless communication device with the authentication server, and providing a communication connection to the second mobile communication device by the WiFi access point, where the WiFi radio transceiver provides a wireless link to the second mobile communication device based on the first service set identifier and wireline transceiver communicatively couples the second mobile communication device to the Internet.

Figure 3:
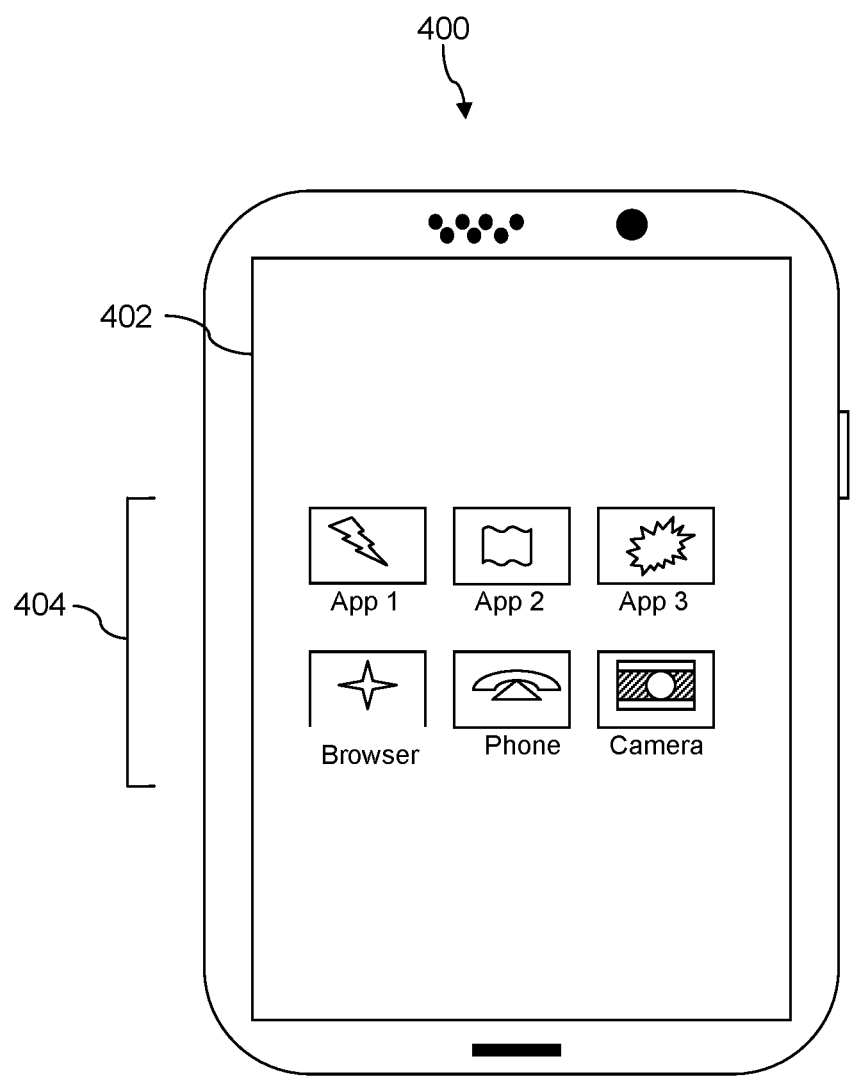
FIG. 3 is an illustration of a mobile communication device according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
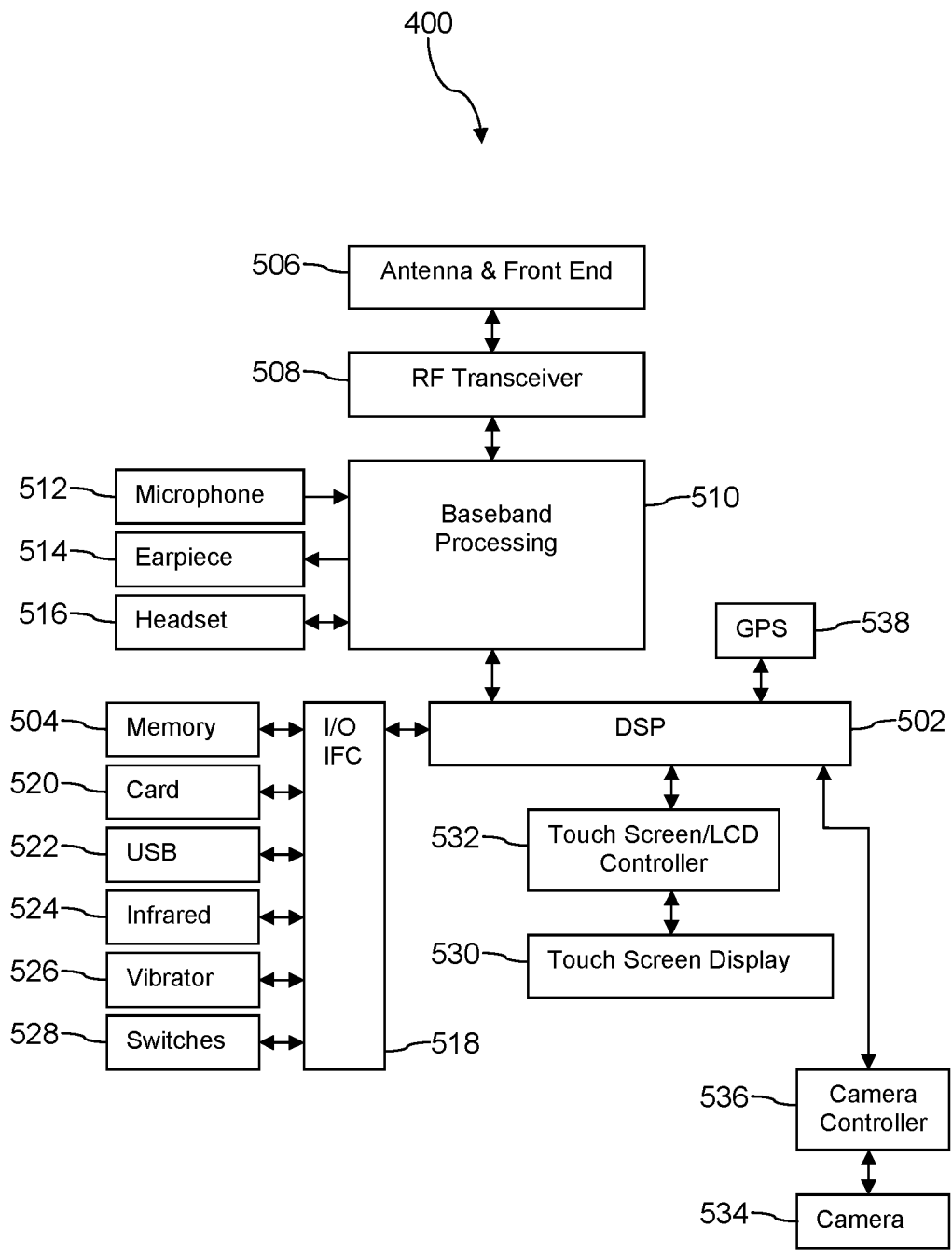
FIG. 4 is a block diagram of a hardware architecture of a mobile communication device according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
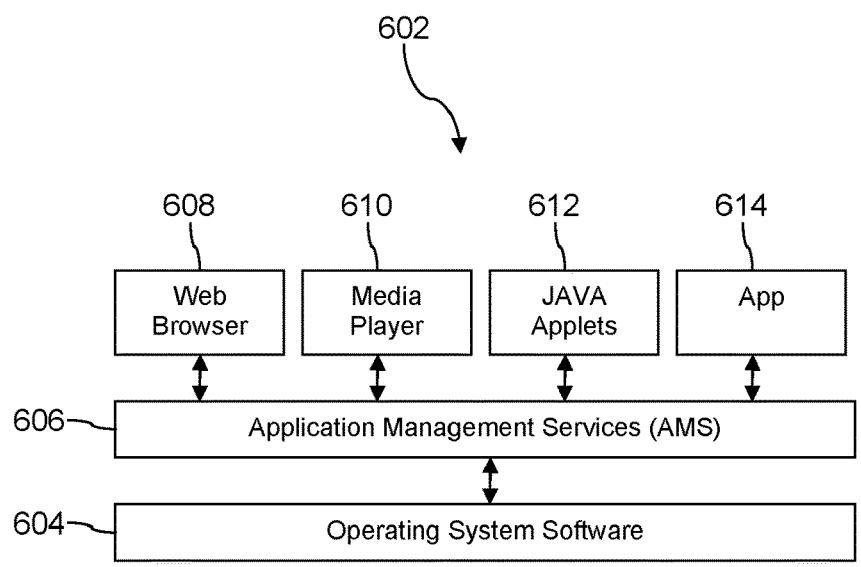
FIG. 5A is a block diagram of a software architecture of a mobile communication device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 5B:
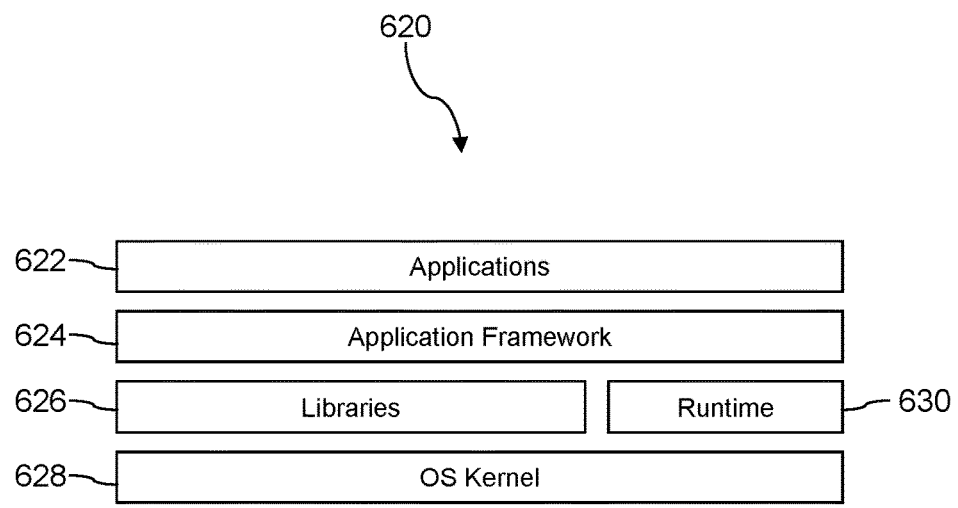
FIG. 5B is a block diagram of another software architecture of a mobile communication device according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
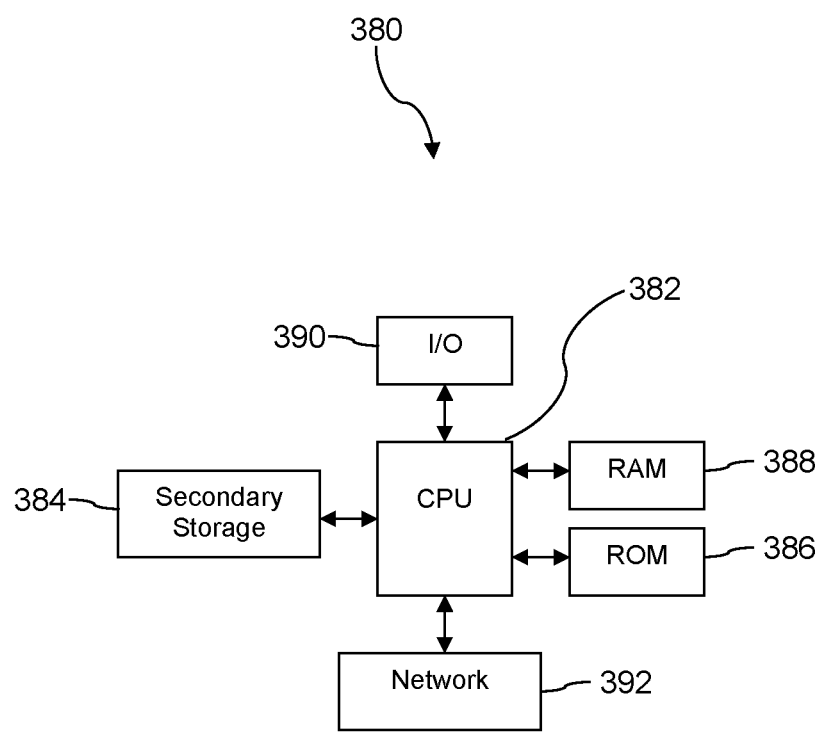
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it.

Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A WiFi access point, comprising:
a WiFi radio transceiver;
a wired transceiver;
a processor;
a non-transitory memory; and
an application stored in the non-transitory memory that, when executed by the processor
transmits a first service set identifier via the WiFi radio transceiver,
receives a request for connection from a wireless communication device via the WiFi radio transceiver directed to the first service set identifier,
determines that the wireless communication device is not HotSpot protocol compliant,
transmits a second service set identifier via the WiFi radio transceiver as a private message to the wireless communication device, where the private message comprises a captive portal,
receives a credential message from the wireless communication device via the WiFi radio transceiver directed to the second service set identifier, wherein the credential message identifies a mobile equipment identity (MEID) and a phone number of the mobile communication device,
transmits an authentication request message via the wired transceiver to an authentication server, where the authentication request message comprises the MEID and phone number of the mobile communication device,
receives an authentication confirmation message via the wired transceiver from the authentication server, and
provides a communication connection to the mobile communication device, where the WiFi radio transceiver provides a wireless link to the mobile communication device based on the second service set identifier and wireline transceiver communicatively couples the mobile communication device to the Internet.

2. The WiFi access point of claim 1, wherein the application further:
receives a request for connection from a second wireless communication device via the WiFi radio transceiver directed to the first service set identifier,
determines that the second wireless communication device is HotSpot protocol compliant,
authenticates the second wireless communication device with the authentication server, and
provides a communication connection to the second mobile communication device, where the WiFi radio transceiver provides a wireless link to the second mobile communication device based on the first service set identifier and wireline transceiver communicatively couples the second mobile communication device to the Internet.

3. The WiFi access point of claim 1, wherein the application determines that the wireless communication device is not HotSpot 2.0 protocol compliant.

4. The WiFi access point of claim 1, wherein the request for connection received by the application is a request for a voice communication connection.

5. The WiFi access point of claim 1, wherein the request for connection received by the application is a request for a data communication connection.

6. The WiFi access point of claim 1, wherein the request for connection received by the application is a request for a premium communication service connection.

7. The WiFi access point of claim 6, where the application further transmits an authorization request to a premium content provider, where the authorization request comprises an identity of a subscriber associated with the mobile communication device.

8. A method of providing a communication connection by a WiFi access point to a wireless communication device, comprising:
transmitting a first service set identifier by a WiFi access point via a WiFi radio transceiver of the WiFi access point;
receiving a request for connection from a wireless communication device directed to the first service set identifier by the WiFi access point via the WiFi radio transceiver;
determining by the WiFi access point based on the request for connection that the wireless communication device is not HotSpot protocol compliant;
transmitting a second service set identifier via the WiFi radio transceiver as a message to the wireless communication device, where the message comprises a captive portal;
receiving a credential message directed to the second service set identifier and comprising credentials from the wireless communication device by the WiFi access point via the WiFi radio transceiver;
transmitting an authentication request message by the WiFi access point via a wired transceiver of the WiFi access point to an authentication server, where the authentication request message comprises the credentials;
receiving an authentication confirmation message by the WiFi access point via the wired transceiver from the authentication server; and
providing a communication connection to the mobile communication device by the WiFi access point, where the WiFi radio transceiver provides a wireless link to the mobile communication device based on the second service set identifier and the wireline transceiver communicatively couples the mobile communication device to the Internet.

9. The method of claim 8, wherein the credential message identifies a mobile equipment identity (MEID) and a phone number of the mobile communication device and wherein the authentication request message comprises the MEID and the phone number of the mobile communication device.

10. The method of claim 8, wherein the captive portal is transmitted by the WiFi access point to the wireless communication device as a private message.

11. The method of claim 8, wherein the WiFi access point determines that the wireless communication device is not HotSpot 2.0 protocol compliant.

12. The method of claim 8, further comprising:
receiving a request for connection by the WiFi access point from a second wireless communication device via the WiFi radio transceiver directed to the first service set identifier,
determining by the WiFi access point that the second wireless communication device is HotSpot protocol compliant,
authenticating the second wireless communication device with the authentication server, and
providing a communication connection to the second mobile communication device by the WiFi access point, where the WiFi radio transceiver provides a wireless link to the second mobile communication device based on the first service set identifier and wireline transceiver communicatively couples the second mobile communication device to the Internet.

13. The method of claim 8, wherein the mobile communication device is one of a mobile phone, a smart phone, a personal digital assistant (PDA), a media player, a wearable computer, a headset computer, a laptop computer, a tablet computer, or a notebook computer.

14. A WiFi access point, comprising:
a WiFi radio transceiver;
a wired transceiver;
a processor;
a non-transitory memory; and
an application stored in the non-transitory memory that, when executed by the processor
receives a request for connection from a wireless communication device via the WiFi radio transceiver directed to a first service set identifier,
determines that the wireless communication device is not configured to support an automatic WiFi access protocol,
transmits a second service set identifier in a message comprising a captive portal via the WiFi radio transceiver to the wireless communication device,
receives a credential message directed to the second service set identifier from the wireless communication device via the WiFi radio transceiver, wherein the credential message comprises an identity of the mobile communication device,
transmits an authentication request message via the wired transceiver to an authentication server, where the authentication request message comprises the identity of the mobile communication device and a designation of a premium communication service,
receives an authentication confirmation message via the wired transceiver from the authentication server indicating that the mobile communication device is authorized for communication service in a common carrier communication network and that the mobile communication device is authorized to access the premium communication service, and
provides a communication connection to the mobile communication device, where the WiFi radio transceiver provides a wireless link to the mobile communication device and the WiFi wireline transceiver communicatively couples the mobile communication device to the Internet, where both the quality of service of the wireless link provided by the wireless transceiver to the mobile communication device and the wired link provided by the wired transceiver to couple the mobile communication device to the Internet is based on the premium communication service.

15. The WiFi access point of claim 14, wherein the application transmits the second service set identifier to the wireless communication device in a private message.

16. The WiFi access point of claim 14, wherein the authentication request message further identifies a subscriber to the premium communication service.

17. The WiFi access point of claim 14, wherein the application determines that the wireless communication device is not configured to support a HotSpot 2.0 protocol.

18. The WiFi access point of claim 14, wherein the mobile communication device is one of a mobile phone, a smart phone, a personal digital assistant (PDA), a media player, a wearable computer, a headset computer, a laptop computer, a tablet computer, or a notebook computer.

19. The WiFi access point of claim 14, wherein the premium communication service is a streaming video communication service.

20. The WiFi access point of claim 14, where the application provides the communication connection to the mobile communication device after receiving the authentication confirmation message and where the WiFi radio transceiver provides the wireless link to the mobile communication device based on the first service set identifier.

* * * * *